Jan. 17, 1939.  A. B. SCOTT  2,144,088
FILM FEED APPARATUS
Filed April 9, 1937
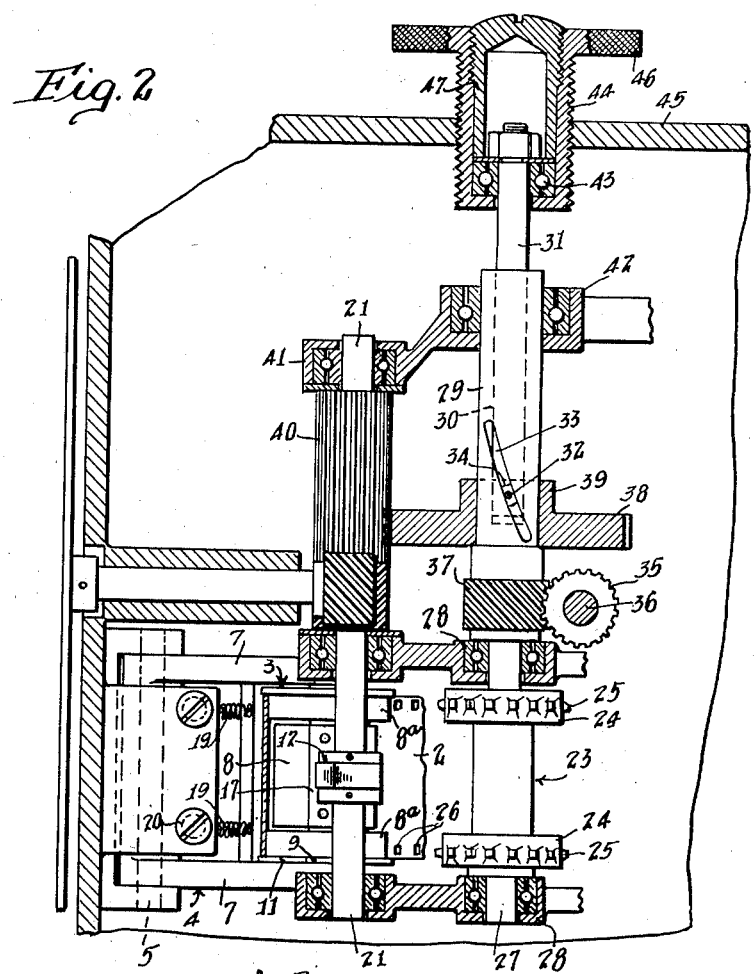
INVENTOR.
Albert B. Scott
BY
Lyon & Lyon
ATTORNEYS Patented Jan. 17, 1939

2,144,088

UNITED STATES PATENT OFFICE 2,144,088

FILM FEED APPARATUS

Albert B. Scott, Los Angeles, Calif., assignor to S. C. K. Corporation, Los Angeles, Calif., a corporation of Nevada Application April 9, 1937, Serial No. 135,948

2 Claims. (Cl. 88—18.6)

This invention relates to a film feed apparatus for motion picture projection machines. In these machines the film is advanced with a step-by-step movement through the film guide, through the agency of perforations near the edges of the film. As usually constructed, the apparatus for accomplishing this concentrates the force that pulls the film through the guide, on the edges of the two perforations, one at each edge of the film. As the force necessary to pull the film through the guide may be considerable, there is a tendency to break the edges of the perforations of the films.

The general object of this invention is to provide an improved film feed apparatus, which will operate effectively to give the step-by-step movement to the film through the film guide, but in which the apparatus is so constructed that the strain on the film perforations is distributed over a great number of perforations. In this way the life of the film is greatly increased. In addition to this, by reason of the fact that the edges of the perforations are kept intact, there is no undesirable effect on the framing of the film on the screen. In this connection it should be understood that where the edges of the perforations of a film in an ordinary film feeding apparatus become injured, a shifting of the film takes place, so that the pictures or frames of the film will not register perfectly on the projection screen, and this necessitates constant framing of the film to keep the picture properly framed on the screen.

A further object of the invention is to provide improved means for effecting the framing of the film with respect to the screen, and to construct the same so that it can be readily accomplished while the projection machine is in operation.

Further objects of the invention will appear hereinafter.

The invention consists in the novel parts and combination of parts to be described hereinafter, all of which contribute to produce an efficient film feed apparatus.

A preferred embodiment of the invention is described in the following specification, while the broad scope of the invention is pointed out in the appended claims.

In the drawing:

Fig. 1 is a vertical section through a machine embodying the invention, and this section is taken near the lower end of the film guide. It illustrates one embodiment of my film feed apparatus.

Fig. 2 is a substantially horizontal section taken about on the line 2—2 of Fig. 1, and further illustrating the driving means for the feed apparatus, and the means whereby the framing of the film may be effected. Figs. 1 and 2 illustrate an embodiment of the invention in which the beater that advances the film is driven by a single toe cam.

Before proceeding to a more detailed description of the invention, it should be stated that this feed apparatus is of a type known as a beater type, in which the film passing from the film guide is engaged by a rocker or reciprocating arm that usually carries a roller engaging the film. From this roller the film passes over to a feed roller that is driven at a uniform high speed. At each forward movement of the beater the film is advanced with a step-by-step movement past the lens. On the return movement of the beater it leaves a loop in the film, and while the film in this loop is being taken up by the uniformly driven take-up roller, the film remains stationary at the lens. In accordance with my invention I can effect framing of the film for the lens by accomplishing an adjusting rotation of the cam that drives the rocker.

Referring more particularly to the parts, 1 indicates the film guide through which the film 2 passes down in passing the gate of the lenses of the projection machine. In the present instance this film 2 passes around a feed roller 3 having a smooth face, said roller being mounted on a rocking arm 4 that is pivotally supported on a pivot pin 5 carried on a fixed support such as a wall 6 of the casing. The rocking arm 4 extends transversely across the plane of the film guide, and is preferably bifurcated so as to present two forks 7 between which a collar 8 is mounted, said collar being secured in a fixed position on an arbor 9 carried in the forks. In the present instance the collar 8 is secured by a pin 10. The arbor 9 is non-rotatable in the forks 7 so that the collar 8 is secured in a fixed position. The roller 3 as illustrated, is really composed of two separated roller sections or wheels 8a that guide the edges of the film, said roller sections having guide flanges 11 at their outer sides for engaging and guiding the edges of the film. These roller sections 8a rotate freely on the arbor 9. Adjacent the collar 8 I provide a continuously rotating cam 12, which preferably has a single toe 13. This cam rotates in an anticlockwise direction and has an abrupt face or edge 14 on its forward side, and a "slow" cam face 15 on its rear side that extends around to the opposite side of the hub 16 of the cam, where this cam edge dies out into the periphery of the hub. This shape of cam gives a quick forward movement for the film 2. The feed movement of the film is accomplished in about one-fifth of the rotation of the cam; about three-fifths of the rotation is occupied by the rest of the cam.

The toe of the cam in its rotation, thrusts against a hardened steel die 17 countersunk in a notch 18 in the face of the collar. After the cam has depressed the rocker arm 4 to pull the film through the film guide 1, the rocker arm 4 is immediately returned by resilient means such as a coil spring 19 located above the arm, and this spring operates to maintain the die 17 pressed against the cam or against an adjustable stop 20 preferably in the form of a screw.

When the rocker 4 moves down in the feeding movement, the roller 3 moves in the general direction of the feed through the film guide 1, so as to pull the film down by a direct pull.

The cam 12 is preferably mounted on a cam shaft 21, which is driven at 1440 R. P. M. The drive for this shaft will be described hereinafter.

For convenience in threading film under the roller 8, the frame plate 6 may be provided with a lower stop 22 for the rocker arm 4, which is also preferably in the form of an adjusting screw.

From the roller or roller sections 8ª, the film passes up and around a take-up roller 23, said roller consisting of a sleeve body having two heads 24 with sprocket teeth 25 to engage the perforations 26 of the film. This take-up roller 23 is fixed on the shaft 27 supported in suitable bearings 28, and this shaft has a tubular extension 29 of enlarged diameter, which is formed with a bore 30, and into this bore extends a framing stem 31, said framing stem carrying a cross pin 32 at its inner end, which projects into a helical slot 33 in the tubular extension 29. Preferably small blocks 34 are carried on the ends of the pins to run in the slot 33. The shaft 27 is driven continuously by any suitable means, and preferably at about 360 R. P. M. In the present instance, this is accomplished by means of the helical gear 35 on the vertical drive shaft 36, which meshes with a similar helical gear 37 so that the roller 23 is driven at a one to one ratio from the vertical shaft 36. This drive shaft 36 is usually driven at 360 R. P. M. from a suitable motor.

The cam is located within the loop of film that extends around the feed roller 3 and is located between the take-up roller 23 and the plane of the guide.

The shaft 27, through suitable gearing, may be utilized to drive the camshaft 21, but in the present instance, for this purpose and to facilitate the framing operation, I prefer to provide a driving gear 38 mounted to slide on the enlarged extension 29 of the shaft 27. The pin 32 is rigidly secured in the gear 38 preferably by driving the same through the hub 39 of this gear. This gear wheel 38 meshes with a pinion 40 preferably constructed as a long pinion rigid on the camshaft, the outer end of the camshaft being rotatably mounted in a suitable bearing 41, which, if desired, may be constructed as an extension from the bearing 42 for the enlarged extension 29 of the take-up roller shaft 27.

With this construction it will be evident that if the stem 31 is moved in or out, the gear wheel 38 will be moved to and fro on the enlarged extension 29 of the shaft 27. This adjusting or shifting of the gear wheel 38 will, of course, by reason of the slot 33, cause a slight rotation of the gear wheel 38 on its own axis, and this adjusting rotation will, of course, be imparted to the elongated roller 40 and cause the camshaft 21 to be rotated forward or back on its own axis. This will change the timing of the cam, enabling the time of feed of the film to be advanced or retarded with respect to the remainder of the mechanism. The effect of this is to alter the relative orientation of the cam 12, and the feed sprocket 23, and this would change the register of the frames on the film with respect to the axis, or gate, of the lens. Hence this adjustment will enable framing to be accomplished by movement of the stem 31 in or out.

In order to enable the stem 31 to be adjusted in this way while the mechanism is in operation, the end of the stem 31 is mounted in a bearing, preferably a ball bearing 43 (see Fig. 2), said ball bearing being mounted in an adjustable bushing 44 that is threaded into a wall 45 of the casing, or on any other fixed support. This bushing 44 has a thumb head 46 for rotating the same at will. The bearing 43 may be held in place in the interior of the bushing 44 by means of a threaded plug 47.

What I claim is:

1. In a film feed apparatus for a motion picture projection machine, the combination of a film guide, a rocker arm, means for pivotally supporting the arm adjacent the film guide so that the arm projects across the plane of the guide, a feed roller carried by the arm receiving a film from the film guide, a take-up roller for receiving the film from the first-named roller and cooperating with the same to form a downwardly extending loop, a cam shaft with a cam located above the first-named roller and between the take-up roller and the plane of the film, resilient means for urging the rocker arm toward the cam, means for rotating the cam, said cam operating to move the feed roller away from the film guide in the general direction in which the film moves in passing through the guide, means for rotating the take-up roller at a uniform speed, a driven gear-wheel rigid on the cam shaft, said feed roller having a tubular shaft and a loose driving gear wheel meshing with said driven gear, a framing stem extending into the bore of the tubular shaft, a pin connecting the same to the hub of the driving gear, said tubular shaft having a helical slot through which said pin passes, whereby the adjustment of the framing stem in or out will effect an adjusting rotation of the cam shaft forward or back, a tubular adjusting screw having a swivel connection with the end of said stem, and a fixed support for said adjusting screw and in which the adjusting screw is threaded.

2. In a film feed apparatus for a motion picture projection machine, the combination of a case, a film guide, a rocker arm, means for pivotally supporting the arm adjacent the film guide so that the arm projects across the plane of the guide, a feed roller carried by the arm receiving a film from the film guide, a take-up roller for receiving the film from the first-named roller and cooperating with the same to form a downwardly extending loop, a cam shaft with a cam located above the first-named roller and between the take-up roller and the plane of the film, resilient means for urging the rocker arm toward the cam, means for rotating the cam, said cam operating to move the feed roller away from the film guide in the general direction in which the film moves in passing through the guide, means for rotating the take-up roller at a uniform speed, a driven gear-wheel rigid on the cam shaft, framing mechanism for effecting a forward or rearward movement of the film, an actuating stem therefor, a regulating bushing having a thread connection with the wall of said case, and a bearing for said stem within the bushing enabling the rotative adjustment of said bushing to adjust the stem in or out.

ALBERT B. SCOTT.